April 25, 1933.  B. TRAVIS  1,905,577
CAT LINE SPOOL
Filed Nov. 3, 1930
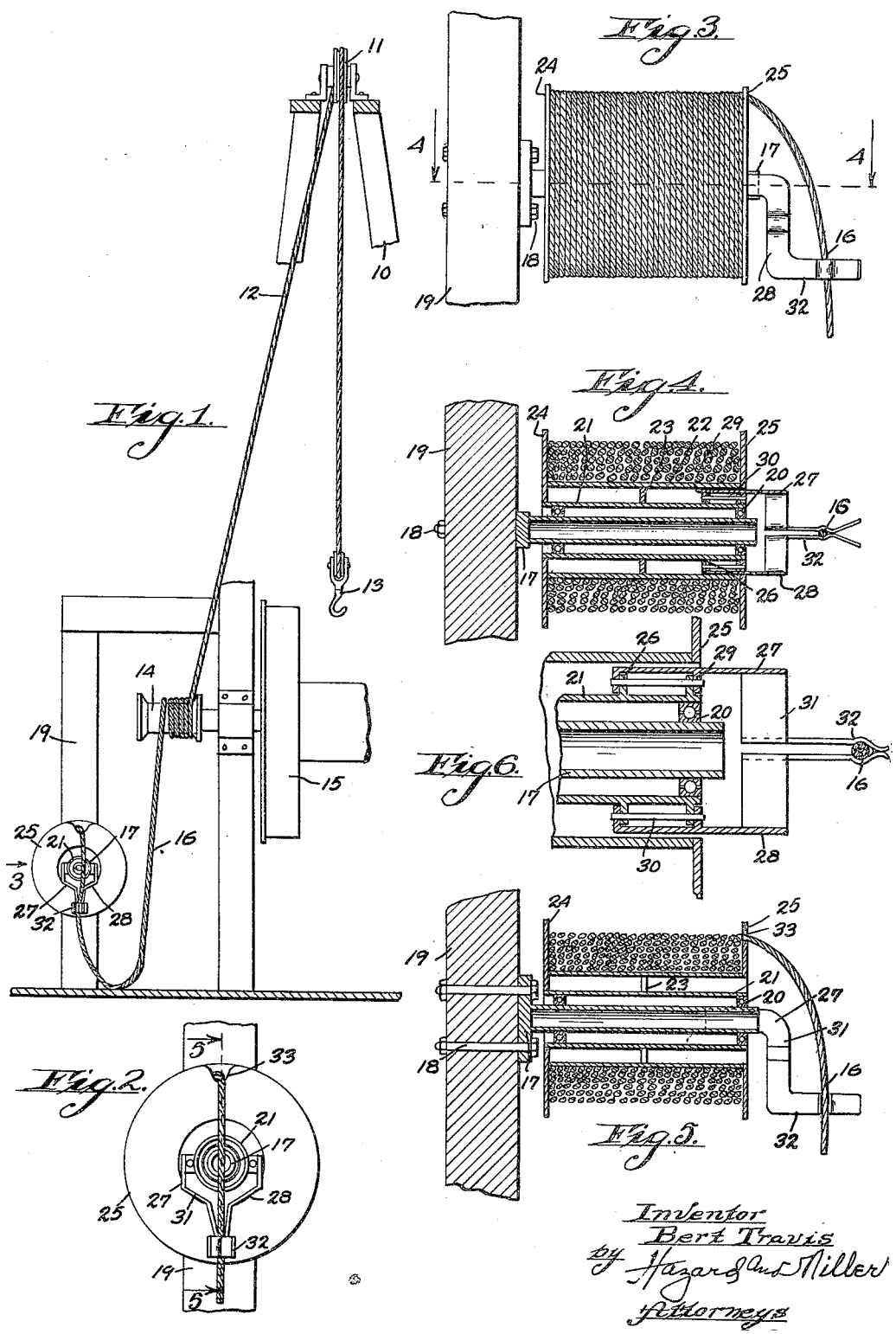

Patented Apr. 25, 1933

1,905,577

UNITED STATES PATENT OFFICE

BERT TRAVIS, OF SANTA FE SPRINGS, CALIFORNIA

CAT LINE SPOOL

Application filed November 3, 1930. Serial No. 493,004.

This invention relates to a cat line spool adapted to be used on a well drilling rig. On the conventional well drilling rig now employed there is a cat line extending over a sheave or pulley on the crown block of the derrick used for various purposes such as bringing pipe into the derrick and elevating it therein. Power is supplied to the cat line by giving the cat line one or more wraps around a cat head associated with the draw works and as the cat head rotates the hook on the cat line may be raised or lowered. It is now customary to provide a swivel hook near the cat head on which the reserve cat line can be looped as it is unwrapped from the cat head. The strain on the cat line and the unwrapping of the cat line from the cat head causes a twist to take place in the reserve cat line which has been withdrawn or unwrapped from the cat head. This twist causes the line to kink and the operator usually turns the swivel hook with the looped reserve thereon to take the kinks and twist out of the cat line. Such a swivel hook is an inconvenient construction in that the operator must spend a good portion of his time at the swivel hook taking out the kinks in the cat line.

It is an object of this invention to provide a novel, simple and advantageous construction for handling the reserve cat line and which will facilitate the taking out of the twist and the removal of the kinks in the cat line which has been unwrapped from the cat head and which will enable the operator to spend practically his entire time near the cat head instead of losing so much time at the swivel hook now employed in removing the kinks.

With the foregoing and other objects in view, which will be made manifest in the following detailed description, and specifically pointed out in the appended claims, reference is had to the accompanying drawing for an illustrative embodiment of the invention, wherein:

Fig. 1 is a partial view in elevation illustrating pertinent parts of a well drilling rig and illustrating the invention as having been installed thereon.

Fig. 2 is a view in end elevation of the improved cat line spool.

Fig. 3 is a view in side elevation of the improved cat line spool.

Fig. 4 is a horizontal section taken on the line 4—4 on Figure 3.

Fig. 5 is a vertical section taken on the line 5—5 on Figure 2.

Fig. 6 is a view on an enlarged scale, illustrating a portion of Figure 4.

Referring to the accompanying drawing, wherein similar reference characters designate similar parts throughout, the reference character 10 designates a well drilling derrick at the top of which there is located a crown block having a sheave or pulley 11 over which the cat line 12 extends. The cat line is illustrated as suspending a hook 13 and the motive power is supplied to the cat line by the cat head 14 associated with the draw works, a portion of which is indicated at 15. The free end of the cat line indicated at 16 is the portion in which the twist becomes apparent and which it is desirable to untwist and wind upon a suitable spool.

To accomplish the above end, the spool comprises a stationary spindle 17 which may be mounted in any suitable manner as by bolts 18 on a support 19 which may form a part of the derrick. About the spindle 17 there are positioned suitable anti-friction bearings 20 and an inner sleeve 21. An outer sleeve 22 surrounds the inner sleeve 21 and is disposed in spaced relation thereto as by spacers 23. End plates 24 and 25 are provided, the end plate 24 being fastened to the end of outer sleeve 22 and to inner sleeve 21. The outer end plate 25 is fastened only to the outer sleeve 22. The inner sleeve 21 adjacent its outer end has on opposite sides pairs of lugs or ears 26. Clamp members 27 and 28 have their inner ends provided with corresponding ears 29 which are fastened to the ears 26 as by pins or bolts 30. The outer ends of the clamp members are bent toward each other as at 31 with their outer extensions arranged in opposition, forming clamping jaws 32 which receive the cat line portion 16. As clearly shown in Figure 2, the periphery of the end plate 25 is preferably formed with a notch 33.

The operation and advantages of the improved cat line spool are as follows. The strain on the cat line 12 which is wrapped about the cat head causes a twist to be present in that portion 16 of the cat line which is between the cat head 14 and the jaws 32. This twist accumulates and kinks the portion 16 of the cat line. As soon as the twist becomes apparent in the portion 16 it is possible for the operator while standing near the cat head 14 to give the portion 16 of the cat line a throw. This throw of the portion 16 of the cat line causes the reel to rotate without pulling the cat line from between the jaws 32. The reel thus turning takes the twist out of the portion 16 of the cat line, removing the kinks so that the flat lay of the line will be preserved. In this way the operator may continually remain near the cat head yet he may easily take the twist out of the cat line by throwing the portion 16 of the line.

Whenever a change of operations takes place so that it is desirable to wind up more reserve on the reel or unwind more reserve from the reel, the portion 16 of the line is given a considerable pull, sufficient to pull the line from between the jaws 32. The jaws 32 can then serve as a handle for a crank and the reel rotated thereby to wind up or unwind reserve line as desired. As soon as the desired amount of reserve has been removed from the reel or wound up thereon, the line is brought through notch 33 and again positioned between the jaws 32, in which position the spool can be advantageously employed to take out the twist in the portion 16 as previously described.

From the above described construction it will be appreciated that a simple, novel and durable construction is provided for handling the reserve cat line as it is unwrapped from the cat head 14. The improved construction not only enables the operator to take the twist out of the line by merely throwing the line but enables the reserve line to be easily spooled so as to be quickly available.

Various changes may be made in the details of construction without departing from the spirit or scope of the invention as defined by the appended claims.

I claim:

1. In combination with a well drilling rig having a cat line and a cat head, a spool on which the cat line may be wound after being removed from the cat head, and means on the spool rotatable therewith adapted to releasably hold the cat line whereby the spool may be rotated without winding up line on the spool to take the twist out of the cat line.

2. In combination with a well drilling rig having a cat line and a cat head, a rotatably mounted spool mounted for rotation independently of the cat head and on which the cat line may be wound after being removed from the cat head, and means on the spool rotatable therewith adapted to releasably hold the cat line whereby the spool may be rotated without winding up line on the spool or unwinding line therefrom to take the twist out of the cat line.

In testimony whereof I have signed my name to this specification.

BERT $\overset{\text{his}}{\times}$ TRAVIS.
mark

Witnesses:
 FRED H. MILLER,
 M. LOUISE HODGE.